United States Patent [19]

Maekawa

[11] Patent Number: 5,309,434
[45] Date of Patent: May 3, 1994

[54] MULTI-MEDIA COMMUNICATION APPARATUS

[75] Inventor: Yoshito Maekawa, Yokohama, Japan

[73] Assignee: Canon Kabushiki Kaisha, Tokyo, Japan

[21] Appl. No.: 754,590

[22] Filed: Sep. 4, 1991

[30] Foreign Application Priority Data

Sep. 5, 1990 [JP] Japan ................. 2-236848
May 1, 1991 [JP] Japan ................. 3-128360

[51] Int. Cl.⁵ .............. H04M 15/04; H04M 15/14
[52] U.S. Cl. .................... 370/62; 370/110.1;
379/34; 379/96; 379/113; 379/130; 379/140;
340/825.17
[58] Field of Search ............... 370/60, 60.1, 94.1,
370/94.2, 62, 110.1, 58.1, 58.2, 58.3; 379/34, 35,
93, 96, 112, 113, 114, 116, 119, 121, 126, 122,
130, 133, 135, 136, 164, 140; 358/440, 406, 400,
450, 462; 340/825.06, 825.17; 395/154

[56] References Cited

U.S. PATENT DOCUMENTS

| | | | |
|---|---|---|---|
| 4,503,288 | 3/1985 | Kessler | 379/131 |
| 4,656,657 | 4/1987 | Hunsicker | 379/140 |
| 4,813,065 | 3/1989 | Segala | 379/130 |
| 4,887,260 | 12/1989 | Carden et al. | 340/825.17 |
| 4,902,881 | 2/1990 | Janku | 235/381 |
| 5,146,490 | 9/1992 | Beckman | 379/140 |
| 5,155,602 | 10/1992 | Terajima | 358/440 |

FOREIGN PATENT DOCUMENTS 0238256 9/1987 European Pat. Off. .
0412298 2/1991 European Pat. Off. .
61-039766 2/1986 Japan .

*Primary Examiner*—Wellington Chin
*Attorney, Agent, or Firm*—Fitzpatrick, Cella, Harper & Scinto

[57] ABSTRACT

A multi-media communication apparatus for communicating with a communication partner by using various kinds of media including image, voice and data. The communication apparatus has a memory for storing information on a communication on each medium, and forms and outputs a report for communication management from information on each communication. The communication management report can be formed manually or automatically and contains communication history along with images for identification of communication partners.

17 Claims, 13 Drawing Sheets

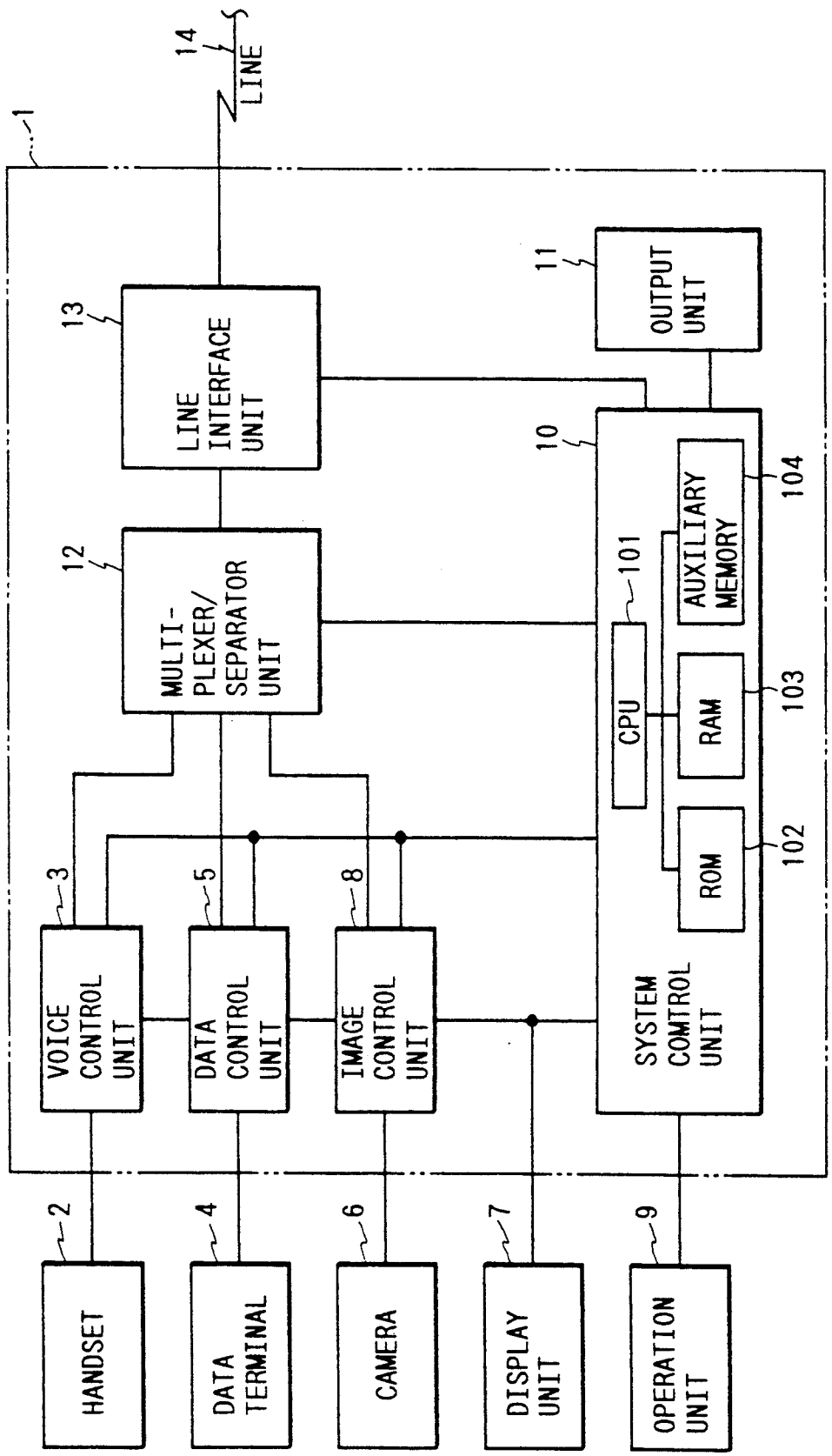

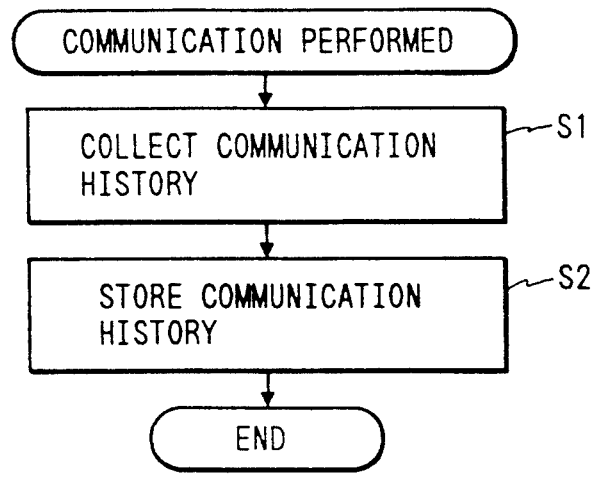
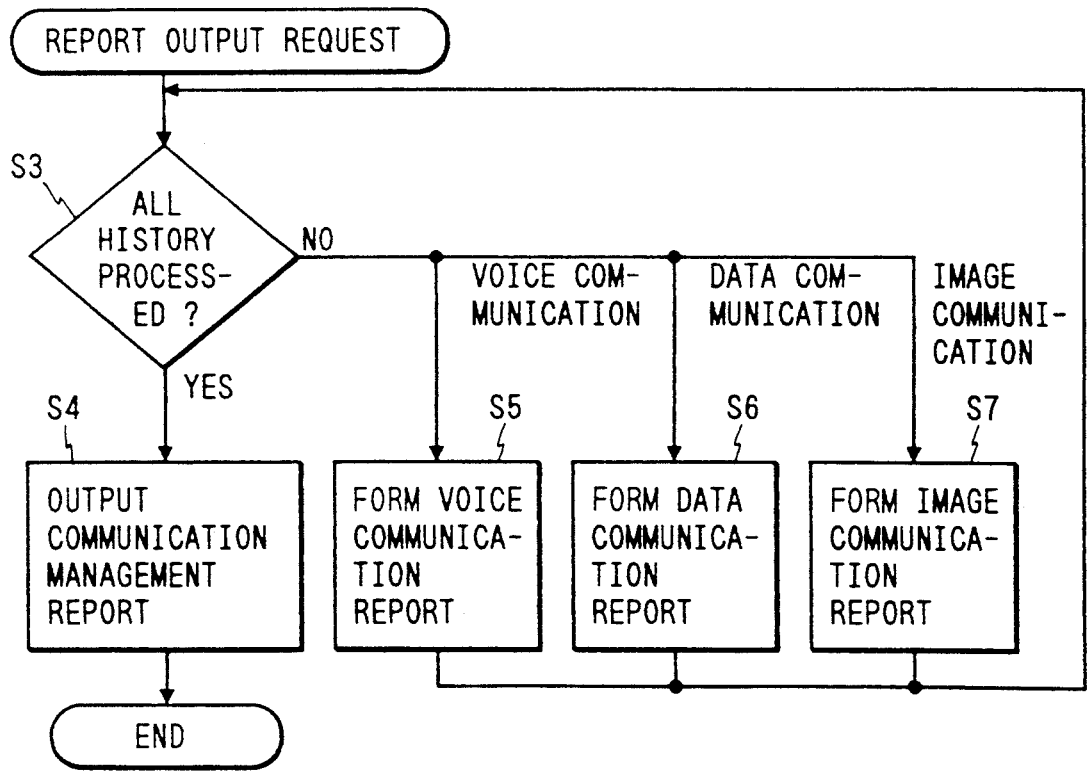

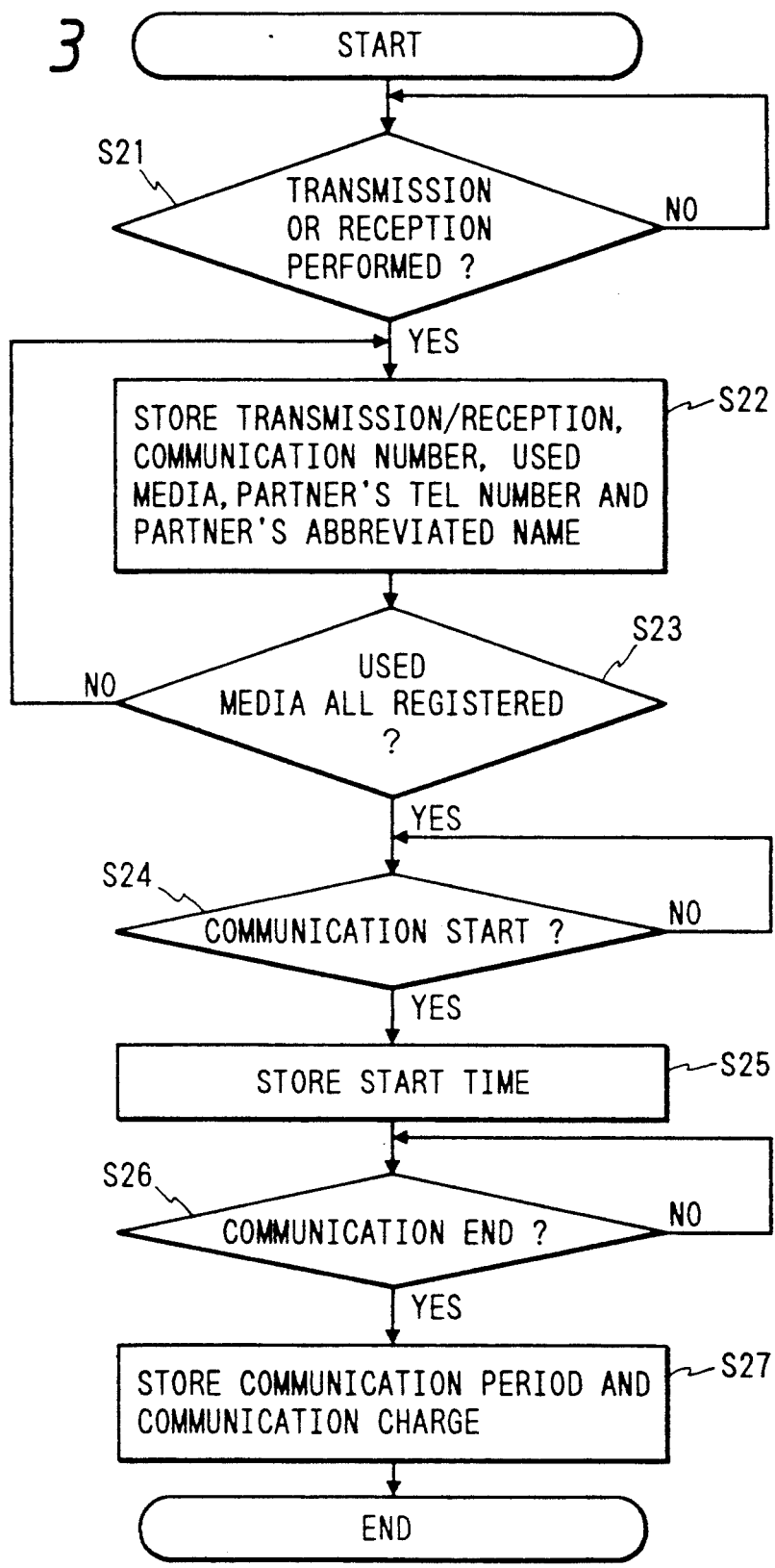

FIG. 4

| MEDIA | COMMUNICATION NUMBER | TRANSMISSION/RECEPTION | COMMUNICATION START TIME | COMMUNICATION PERIOD | TERMINAL NUMBER ETC | CHARGE |
|---|---|---|---|---|---|---|
| VOICE | 1 | TRANSMISSION | 9:01 | 0,10,15 | 123-4567 | 30 |
| IMAGE | 1 | TRANSMISSION | 9:01 | 0,10,15 | 123-4567 | 100 |
| VOICE | 2 | RECEPTION | 9:31 | 0,02,08 | 234-5678 | — |
| ----- | | | | | | |

FIG. 8

| COMMUNICATION NUMBER | USED MEDIA | | TRANSMISSION/RECEPTION | COMMUNICATION START TIME | COMMUNICATION PERIOD | TERMINAL NUMBER ETC | CHARGE | MODE |
|---|---|---|---|---|---|---|---|---|
| 1 | VOICE | 1 | TRANSMISSION | 9:01 | 0,10,15 | 123-4567 | 30 | 1 |
|   | DATA | 1 |              | 9:05 | 0,06,15 |          | 70 |   |
|   | IMAGE | 1 |             | 9:01 | 0,10,15 |          | 100 |   |
| 2 | VOICE | 1 | RECEPTION | 9:31 | 0,02,08 | 234-5678 | — | 5 |
|   | DATA | 0 | | | | | | |
|   | IMAGE | 0 | | | | | | |

FIG. 6

```
MEDIA:VOICE

COMMUNICATION NUMBER — 0001   TRANSMISSION
    PARTNER'S TELEPHONE NUMBER — 123-4567
    PARTNER'S ABBREVIATED NAME — OX COMPANY
    START TIME                 — 06/19 9:01
    COMMUNICATION PERIOD       — 0, 10, 15
    COMMUNICATION CHARGE       — ¥30

COMMUNICATION NUMBER — 0002   RECEPTION
    PARTNER'S TELEPHONE NUMBER — 234-5678
    PARTNER'S ABBREVIATED NAME — XY SALES COMPANY
    START TIME                 — 06/19 9:31
    COMMUNICATION PERIOD       — 0, 02, 08
    COMMUNICATION CHARGE       — —
```

```
MEDIA:IMAGE

COMMUNICATION NUMBER — 0001   TRANSMISSION
    PARTNER'S TELEPHONE NUMBER — 123-4567
    PARTNER'S ABBREVIATED NAME — OX COMPANY
    START TIME                 — 06/19 9:01
    COMMUNICATION PERIOD       — 0, 10, 15
    COMMUNICATION CHARGE       — ¥100
```

```
MEDIA:DATA
```

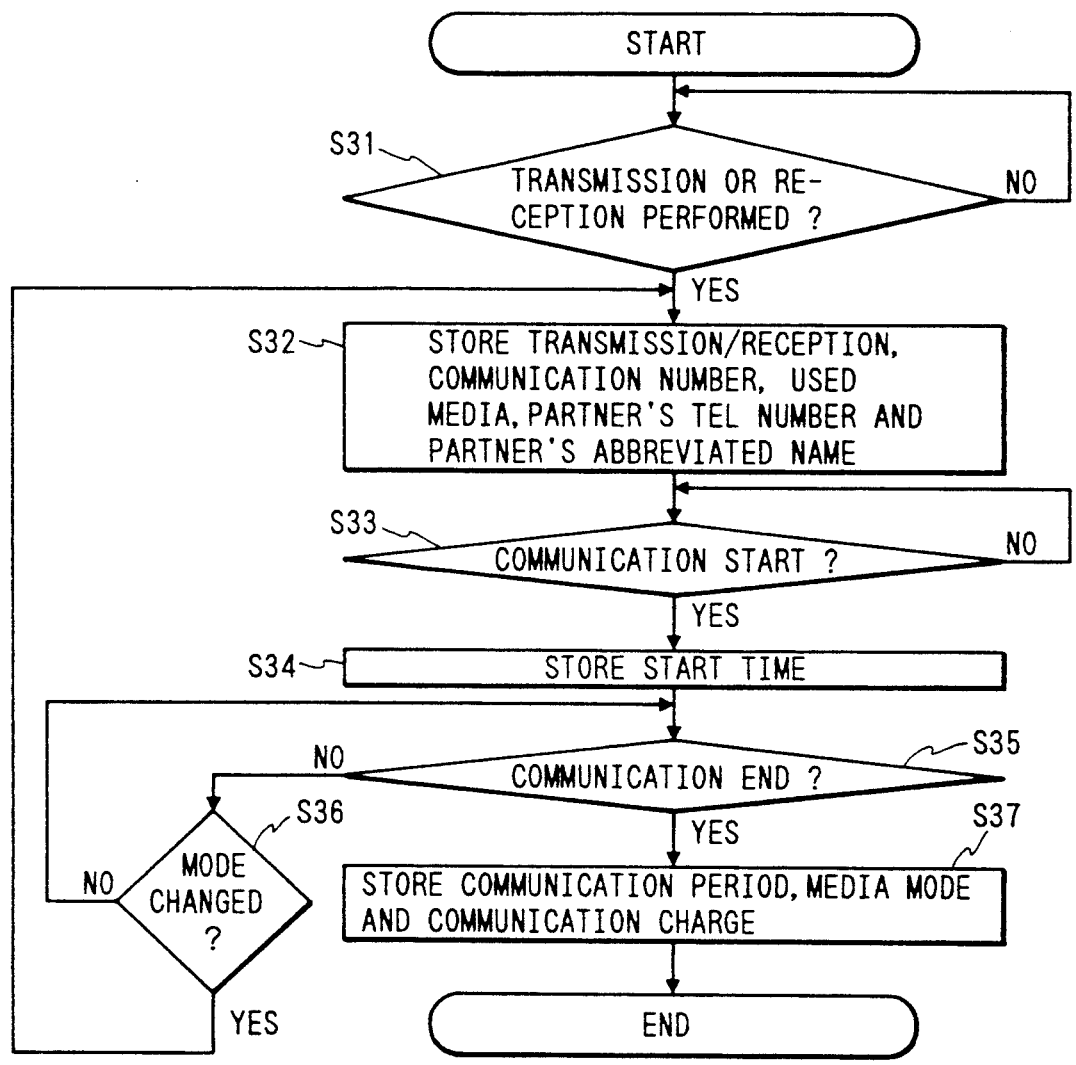

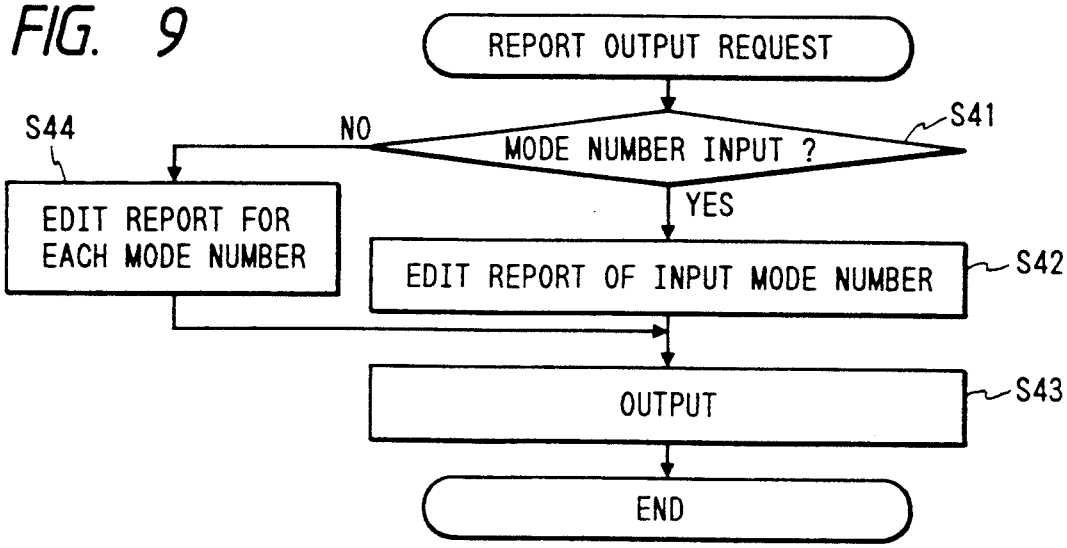
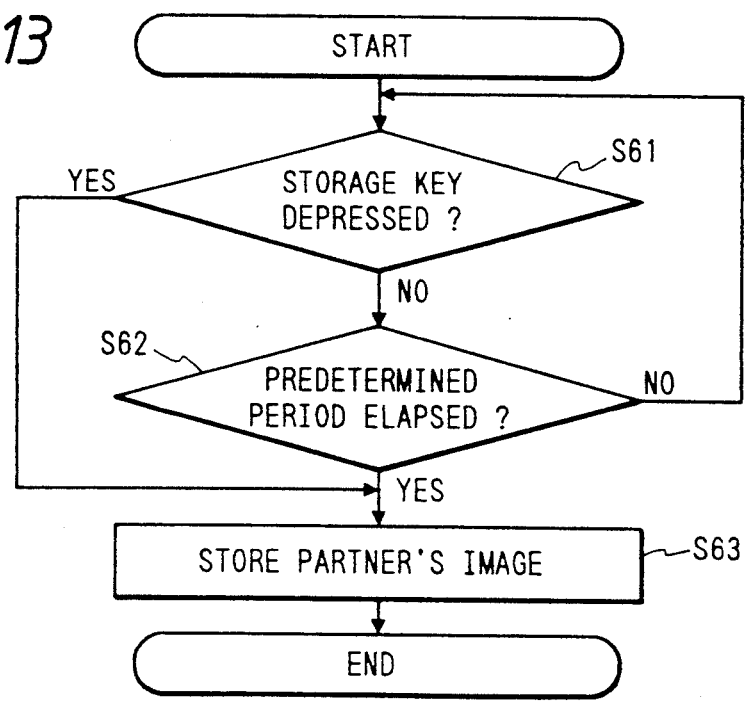

FIG. 10

```
MODE NO.1   USED MEDIA   VOICE·DATA·IMAGE
  COMMUNICATION NUMBER — 0001   TRANSMISSION
  PARTNER'S TELEPHONE NUMBER — 123-4567
  PARTNER'S ABBREVIATED NAME — OX COMPANY
```

|       | START TIME | COMMUNICATION PERIOD | CHARGE |
|-------|------------|----------------------|--------|
| VOICE | 9:01       | 0, 10, 15            | 30     |
| DATA  | 9:05       | 0, 06, 15            | 70     |
| IMAGE | 9:01       | 0, 10, 15            | 100    |

```
MODE NO.5   USED MEDIA   VOICE
  COMMUNICATION NUMBER — 0002   RECEPTION
  PARTNER'S TELEPHONE NUMBER — 234-5678
  PARTNER'S ABBREVIATED NAME — XY SALES COMPANY
```

|       | START TIME | COMMUNICATION PERIOD | CHARGE |
|-------|------------|----------------------|--------|
| VOICE | 9:31       | 0, 02, 08            | —      |

FIG. 15

| COMMUNICATION HISTORY DATA | |
|---|---|
| 0001 TRANSMISSION | 0002 TRANSMISSION |
| VOICE·IMAGE | VOICE·IMAGE·DATA |
| 123 4567 | 234 5678 |
| OX COMPANY | XY SALES COMPANY |
| 06/19 10:15 | 06/19 13:52 |
| 05'29 | 07'11 |
| ¥20 | ¥30 |

PARTNER'S IMAGE DATA

FIG. 16

COMMUNICATION MANAGEMENT REPORT

| | |
|---|---|
| COMMUNICATION NUMBER — 0001 | TRANSMISSION USED MEDIA — VOICE·IMAGE |
| PARTNER'S TELEPHONE NUMBER | — 123 4567 |
| PARTNER'S ABBREVIATED NAME | — OX COMPANY |
| START TIME | — 06/19 10:15 |
| COMMUNICATION PERIOD | — 05'29 |
| COMMUNICATION CHARGE | — ¥20 |

(0001)

| | |
|---|---|
| COMMUNICATION NUMBER — 0002 | TRANSMISSION USED MEDIA — VOICE·IMAGE·DATA |
| PARTNER'S TELEPHONE NUMBER | — 234 5678 |
| PARTNER'S ABBREVIATED NAME | — XY SALES COMPANY |
| START TIME | — 06/19 13:52 |
| COMMUNICATION PERIOD | — 07'11 |
| COMMUNICATION CHARGE | — ¥30 |

(0002)

MULTI-MEDIA COMMUNICATION APPARATUS

BACKGROUND OF THE INVENTION

1. Field of the Invention

This invention relates to a multi-media communication apparatus for performing communication by using a combination of various kinds of media such as image, speech (audio), data (code data) and, more particularly, to a multi-media communication apparatus capable of outputting a communication management report containing communication information on communication partners, media used for communication and the like.

2. Related Background Art

Conventionally, in facsimile apparatuses for image communication, information on the times when communications are performed, the names of communication partners and so on is stored in a memory and this information is output as a communication management report by an instruction from the operator.

Recently, a communication service using the Integrated Service Digital Network (ISDN) has been put to practical use. Audio-visual services using a digital line such as that of the ISDN therefore attract attention and the use of multi-media communication apparatuses such as TV telephone sets and TV meeting systems capable of communication using multiple media including images, voice and code data is spreading.

In conventional multi-media communication apparatus of this kind, communication management is not performed and no communication management report is formed and output. It is therefore difficult to confirm the time when a communication is performed, the name of the communication partner and media used for the communication.

SUMMARY OF THE INVENTION

In view of the above problem, an object of the present invention is to provide a multi-media communication apparatus capable of forming and outputting a communication management report, whereby communication charges and communication history can be used for communication management.

Another object of the present invention is to provide a multi-media communication apparatus in which communication history is recorded with respect to media such as image, voice and data and output as a report to enable communication conditions and changes with respect to the media to be easily recognized.

Still another object of the present invention is to provide a multi-media communication apparatus which enables media used for communications to be easily recognized with respect to the communications.

A further object of the present invention is to provide a multi-media communication apparatus capable of outputting a communication management report by using as a parameter a medium used for communication as a parameter.

A still further object of the present invention is to provide a multi-media communication apparatus capable of forming and outputting a communication management report by combining communication history data and partner's image data.

A still further object of the present invention is to provide a multi-media communication apparatus which enables the operator to store a partner's image to be recorded on a communication report without being conscious of this operation as well as to store and record an arbitrary partner's image on a communication report.

A still further object of the present invention is to provide a multi-media communication apparatus which ensures that a communication management report can be output without failure and which enables the operator to output a communication management report any time.

A still further object of the present invention is to provide a multi-media communication apparatus which enables identification of a communication partner in a case where incoming from the communication partner is received during operator's absence.

The above and other objects of the present invention will become apparent from the following detailed description given in conjunction with the accompanying drawings.

BRIEF DESCRIPTION OF THE DRAWINGS

FIG. 1 is a block diagram of the construction of a multi-media communication apparatus in accordance with a first embodiment of the present invention;

FIGS. 2 and 3 are flow charts of a process for communication in accordance with the first embodiment;

FIG. 4 is a diagram of communication management information registered in a memory in accordance with the first embodiment;

FIG. 5 is a flow chart of a procedure of control at the time of outputting a communication management report;

FIG. 6 is a diagram of examples of communication managements in accordance with the first embodiment;

FIG. 7 is a flow chart of the operation of storing communication history in accordance with a second embodiment;

FIG. 8 is a diagram of contents of a memory in accordance with the second embodiment;

FIG. 9 is a flow chart of report outputting in accordance with second embodiment;

FIG. 10 is a diagram of examples of output communication management reports in accordance with the second embodiment;

FIG. 13 is a flow chart of a procedure of control at the time of storing a partner's image in a memory;

FIG. 15 is a diagram of memory contents in accordance with the third embodiment; and FIG. 16 is a diagram of an example of an output communication management report in accordance with the third embodiment.

DESCRIPTION OF THE PREFERRED EMBODIMENTS

First Embodiment

Figure 11:
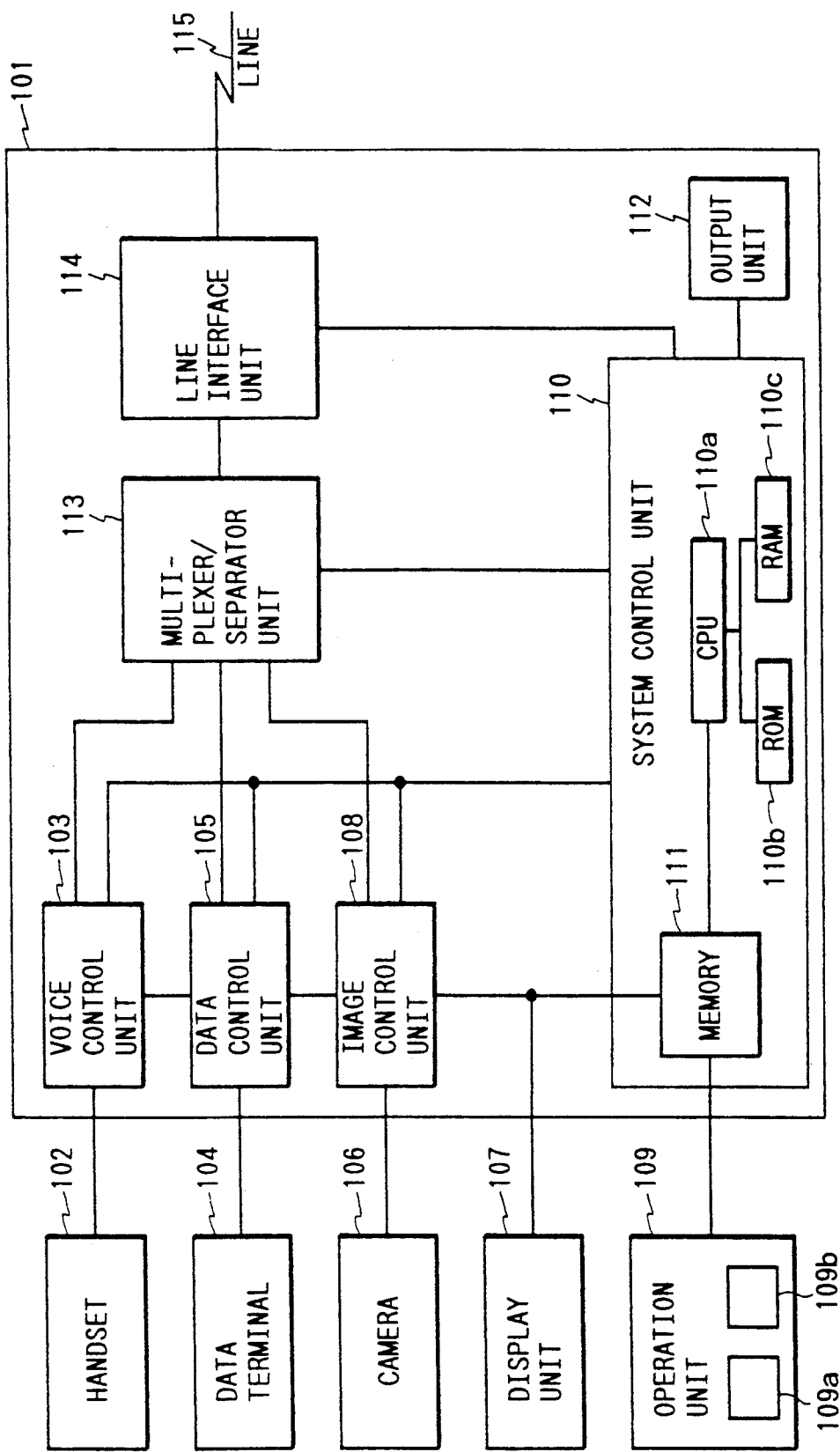
FIG. 11 is a block diagram of the construction of a multi-media communication apparatus in accordance with a third embodiment of the present invention.

First, an example of a system for outputting reports as communication results with respect to a several kinds of media, i.e., voice (audio), data and image in accordance with a first embodiment of the present invention will be described below.

FIG. 1 is a block diagram of a multi-media communication apparatus 1 in accordance with this embodiment. The multi-media communication apparatus 1 has a handset 2 provided as a voice (audio) input/output means and connected to a voice (audio) control section 3. The voice control section 3 has a voice (audio) encoding/decoding section for encoding various voice (audio) signals to be transmitted and for decoding received voice signals, an on/off-hook detection section for detecting whether the handset 2 is in an on-hook state or in an off-hook state, and a voice interface section for generating various tones including a dial tone, call tone, a busy tone and an incoming tone. A data terminal 4 for data communication is connected to a data control section 5 which is arranged to perform data transmission/reception with the data terminal 4. A camera 6 is provided as an image input means. A display unit 7 displays an input image supplied from the camera 6, an image received through a line 14, operation display windows and the like. The camera 6 and the display unit 7 are connected to an image (video) control unit 8. The image control unit 8 has an image encoding/decoding section for encoding image signals to be transmitted and for decoding received image signals, and a video interface section for changing or dividing display windows of the display section 7. An operation unit 9 having a keyboard, a touch panel or the like for inputting for overall control of the apparatus 1 is connected to a system control unit 10. The system control unit 10 has a CPU 101, a ROM 102, a RAM 103 and an auxiliary memory 104 and serves to control and observe the whole of the apparatus 1 or execute various application programs. The system control unit 10 incorporates, as described later, memory means (RAM 103, auxiliary memory 104) for collecting and storing communication history with respect to each medium, and a formation means (CPU 101) for forming a communication management report on a management of communication on each medium based on the communication history collected and stored. An output unit (output means) 11 for outputting communication management reports formed by the system control unit 10 is connected to the system control unit 10. The voice control unit 3, the data control unit 5, the image control unit 8 and the display unit 7 are respectively connected to the system control unit 10. The voice control unit 3, the data control unit 5 and the image control unit 8 are respectively connected to a multiplex/separator unit 12. The multiplex/separator unit 12 multiplexes a voice signal supplied from the voice control unit 3, data from the data control unit 5 and an image signal from the image control unit 8 and separates reception frames received through the line 14 with respect to the media. The multiplex/separator unit 12 is connected to a line interface unit 13 for controlling the line in accordance with the ISDN user network interface. The line interface unit 13 is connected to the ISDN through the line 14.

A procedure of communication history processing at the time of communication (transmission or reception) effected in the thus-constructed multi-media communication apparatus 1 will be described below with reference to the flow chart of FIG. 2. Communication history is first collected by the system control unit 10 in step S1, and the collected communication history is stored in the auxiliary storage 104 in step S2. Communication history referred to herein includes information items, e.g., communication numbers, communication times, periods of time for communication, communication partner terminal numbers, abbreviations of the names of partner terminals, used media and communication charge.

FIG. 3 shows details of the flow chart of FIG. 2 and FIG. 4 shows the content of information stored in the memory 104.

In step S21, the system control unit 10 monitors to determine whether or not calling or incoming through the line interface unit 13 has occurred. If there is no calling or incoming, this step is repeated until calling or incoming takes place. If there is a calling or incoming, the process proceeds to step S22 and a transmission/reception number, used media, a partner's telephone number and an abbreviated partner's name are stored in the memory 104 as shown in FIG. 4. In the operation of step S22, information on each medium is stored if a plurality of mediums are used.

In step S23, determination is made as to whether or not the contents of all used media have been registered in the memory 104. The process proceeds to step S24 if they have been registered, or returns to step S22 if they have not been registered.

That is, in a case where both voice and image media are used for communication with the partner, the communication contents are stored in the memory while separating the used media in accordance with the media categories, image and voice.

In the case of ISDN communication, calling and incoming is effected through channel D (control channel) and information on the partner's telephone number and the abbreviated partner's name is sent through channel D. In step S24, the system control unit 10 monitors to determine whether or not communication through a channel B (information channel) has actually been started. If No, step S24 is repeated until communication is started. If Yes, the process proceeds to step S25 and the start time is stored in the memory 104.

In step S26, the system control unit 10 monitors to determine whether or not communication through channel B has been completed. If No, step S26 is repeated until the communication is completed. If Yes, the process proceeds to step S27 and the period of time for communication and a communication charge are stored in the memory 104. In the case of ISDN communication, communication termination is controlled through channel D and information on communication charge is sent through channel D.

Start times and communication periods are stored with respect to communications of the same communication number, and communication charges are stored with respect to media based on the notification through channel D, as shown in FIG. 4.

Next, a procedure for outputting communication reports in response to an instruction sent from the operation unit 9 by an operator will be described below with reference to the flow chart of FIG. 5.

If outputting communication reports is requested, the system control unit 10 determines in step S3 as to whether or not the whole communication history has been processed to form a communication management report with respect to each medium. If No, processing for forming communication management reports on non-processed communication history is performed in steps S5, S6, and S7. Communication reports formed in these steps enable management of communication on each medium. In step S5, communications on voice media are extracted from the memory 104 and processing for forming a voice communication management report is effected. In step S6, communications on data media are extracted from the memory 104 and processing for forming a data communication management report is effected. In step S7, communications on image media are extracted from the memory 104 and processing for forming an image communication management report is effected. The process thereafter returns to step S3.

If Yes in step S3, that is, the whole processing history has been processed to form communication management reports, communication management reports on management with respect to media are output from the output unit 11 in step S4, and the process is terminated. FIG. 6 shows examples of output communication management reports.

In the above-described embodiment, the operation of grouping communication management reports with respect to media is performed at the time of formation of communication management reports. However, this is not exclusive and this operation may be performed at the time of collection/storage of communication history.

The format of output communication reports in accordance with the present invention is not limited. Communication management reports may be output separately with respect to media as in the case of the described embodiment, or the communication reports may be output in a format without being separated with respect to media such that management can be performed collectively with respect to all media.

In the above-described embodiment, media are grouped into three categories: image, voice and data. However, "voice" can be sorted into sub divisions, for example, speech, 3.1 kHz audio, and 7 kHz audio. Also, "image" can be sorted variously, for example, it is sorted into animated image and still image.

As described above, the multi-media communication apparatus in accordance with the present invention is characterized by including memory means for collecting and storing communication history with respect to communication on each medium, a formation means for forming a communication management report on management with respect to each medium, and an output means for outputting communication management reports formed by the formation means.

A communication management report on management with respect to each medium is thereby automatically formed and output, thereby enabling management of communication charge such that the overall communication cost and the communication cost with respect to each medium are calculated.

According to the present invention, past communication history can easily be referred to and it is therefore possible to improve the facility with which communication is performed.

In a case where a caretaking function is provided, incoming during operator's absence can be recorded by outputting a communication management report.

Second Embodiment

Next, an example of outputting a communication report with respect to media used for communication with the partner's communication apparatus in accordance with a second embodiment of the present invention will be described below. It is possible to set seven modes of using media: a first mode in which three media, voice, data and image, are used; a second mode in which two media, voice and data, are used; a third mode in which two media, voice and image, are used; a fourth mode in which two media, data and image, are used; a fifth mode in which only voice is used; a sixth mode in which only data is used; and a seventh mode in which image is used.

FIG. 7 shows a process of storing communication history in accordance with the second embodiment, and FIG. 8 shows a state of storage in memory 104.

In step S31, system control unit 10 monitors to determine whether or not any calling or incoming through line interface unit 13 has occurred. If there is no calling or incoming, this step is repeated until calling or incoming takes place. If there is a calling or incoming, the process proceeds to step S32 and a transmission/reception number, used media, a partner's telephone number and an abbreviated partner's name are stored in memory 104.

If the used mediums are voice and image, "1" is first written in cells "voice" and "image" for used media, as shown in FIG. 8. (In cells for used media "data", the content is changed from "0" to "1" by subsequently adding data by communication.)

In step S33, system control unit 10 monitors to determine whether or not communication through channel B (information channel) has actually been started. If No, step S33 is repeated until communication is started. If Yes, the process proceeds to step S34 and the start times with respect to voice and image are stored in memory 104.

In step S35, system control unit 10 monitors to determine whether or not communication through channel B has been completed. If No, the process proceeds to step S36 to determine whether or not the communication mode has been changed. If the communication mode has been changed, the process returns to step S32. If "data" is added to communication media, the content in the cell for used medium "data" is changed to "1" and the data transmission start time is stored (FIG. 8), in steps S32 to S34.

When the communication is completed, the process proceeds to step S37 to store in memory 104 the media mode determined from the media used last, the periods of time for communication and communication charges, thereby completing the process. In the case of ISDN, communication termination is controlled through channel D and information on communication charge is sent through channel D.

FIG. 9 shows a flow chart for report outputting. After report outputting has been requested, determination is made in step S41 as to whether or not a mode number input from the operator, designating outputting of a report has been received. In the case of No, the process proceeds to step S44 to edit a report for each mode number. That is, information on the communications, stored in memory 104 with respect to all of the mode numbers, such as information in mode 1 and information in mode 2, is edited. In step S43, the reports are output in order of the mode numbers.

FIG. 10 shows examples of output reports edited from the memory contents shown in FIG. 8.

If it is determined in step S41 that a mode number has been input after the report output request, the process proceeds to step S42 to edit a report with respect to the input mode number. In step S34, the report with respect to the input mode number is output. That is, if "1" is input as a mode number, reports on communications using three media, voice, data and image, is output.

Thus, in the second embodiment, a communication report formed for each medium for communication can be output and it is possible to easily confirm the medium used for one-time communication, the communication period and the communication charge with respect to each medium.

Further, according to the second embodiment, it is also possible to recognize media at least available for the partner's apparatus. For example, a report with respect to mode 1 is output, terminals capable of three kinds of communication using voice, data and image.

Third Embodiment

An example of outputting a communication management report with a received image in accordance with a third embodiment of the present invention will be described below.

FIG. 11 is a block diagram of a multi-media communication apparatus 101 in accordance with the third embodiment. The multi-media communication apparatus 101 includes a handset 102 provided as a voice (audio) input/output means, and a voice control section 103 having a voice (audio) encoding/decoding section for encoding various voice (audio) signals to be transmitted and for decoding received voice signals, an on/off-hook detection section, and a voice (audio) interface section for generating various tones.

The apparatus 101 also includes a data terminal 104 for data communication, a data control section 5 arranged to perform data transmission/reception with the data terminal 104, a camera 106 provided as an image (video) input means, a display unit 107 for displaying an input image supplied from the camera 106, an image received through a line 115, operation display windows and the like, and an image (video) control unit 108 having an image (video) encoding/decoding section for encoding image (video) signals to be transmitted and for decoding received image signals, and a video interface section for changing or dividing display windows of the display section 7.

The apparatus 101 further includes an operation unit 109 having a keyboard, a touch panel or the like for inputting for overall control of the apparatus 101, a system control unit 110 having a CPU 110a, a ROM 110b, a RAM 110c and a memory (not shown) and serving to control and observe the whole of the apparatus 101 or to execute various application programs, and a memory unit (memory means) 111 for storing communication history and a communication partner's image processed by the image control unit 108.

In the system control unit 110, communication history is collected at the time of communication, the communication history is stored in the memory 111 along with the received partner's image, and a communication management with the partner's image is formed and is output by the output unit (output means) 112. Thus, the system control unit 110 has a formation means for forming a management report.

The apparatus 101 further includes a multiplex/separator unit 113 for multiplexing a voice signal from the voice control unit 103, data from the data control unit 105 and an image signal from the image control unit 108 and for separating reception frames received through the line 115 with respect to media, a line interface unit 114 for controlling the line in accordance with the ISDN user network interface, and a line 115 for connection to the ISDN.

A process of storing communication history and a partner's image effected for each communication by the thus-constructed multi-media communication apparatus will be described below with reference to the flow chart of FIG. 12.

In step S51, the system control unit 110 monitors to determine whether or not calling or incoming through the line interface unit 114 has occurred. If there is no calling or incoming, step S51 is repeated until calling or incoming takes place. If there is a calling or incoming, the process proceeds to step S52 and a transmission/reception number, used media, a partner's telephone number and an abbreviated partner's name are stored in the memory 111.

In the case of ISDN communication, calling and incoming is effected through channel D (control channel) and information on the partner's telephone number and the abbreviated partner's name is sent through channel D. In step S53, the system control unit 110 monitors to determine whether or not communication through channel B (information channel) has actually been started. If No, step S53 is repeated until communication is started. If Yes, the process proceeds to step S54 and the start time is stored in the memory 111.

In step S55, the partner's image sent from the other end of the line is stored. That is, it is processed by the image control unit 108 and is thereafter stored in the memory 111.

In step S56, the system control unit 110 monitors to determine whether or not communication through channel B has been completed. If No, step S56 is repeated until the communication is completed. If Yes, the process proceeds to step S57 and the period of time for communication and a communication charge are stored in the memory 111. In the case of ISDN communication, communication termination is controlled through channel D and information on communication charge is sent through channel D.

Communication history and partner's images are stored in the memory 111 by this communication history/partner's image storing process, as shown in FIG. 15. That is, communication history data 111-1 including communication numbers, used media, partner's telephone numbers, abbreviated partner's names, (communication) start times, communication periods and communication charges is stored in a table form such as that shown in an upper section of FIG. 15, while partner's image data 111-2 is stored in a block form shown in a lower section of FIG. 5.

The operation of storing a partner's image in step S55 will be described below based on the flow chart of FIG. 13.

The operation unit 109 is provided with a memory key 109a (first operation means) for manually storing a received partner's image. In step S61, determination is made as to whether or not the memory key 109a of the operation unit 109 has been depressed. If No, the process proceeds to step S62. The system control unit 110 has a time monitoring means for automatically storing a partner's image, whereby, in step S62, determination is made as to whether or not a certain length of time has elapsed after the start of communication. If No, the process returns to step S61 and the above determination operation is repeated.

It is determined in step S61 that the momory key 109a has been depressed, or it is determined in step S62 that the certain length of time has elapsed, the process proceeds to step S63 and the partner's image sent from the other end of the line is processed by the image control unit 108 and is thereafter stored in the memory 111, thereby completing the process.

Figure 14:
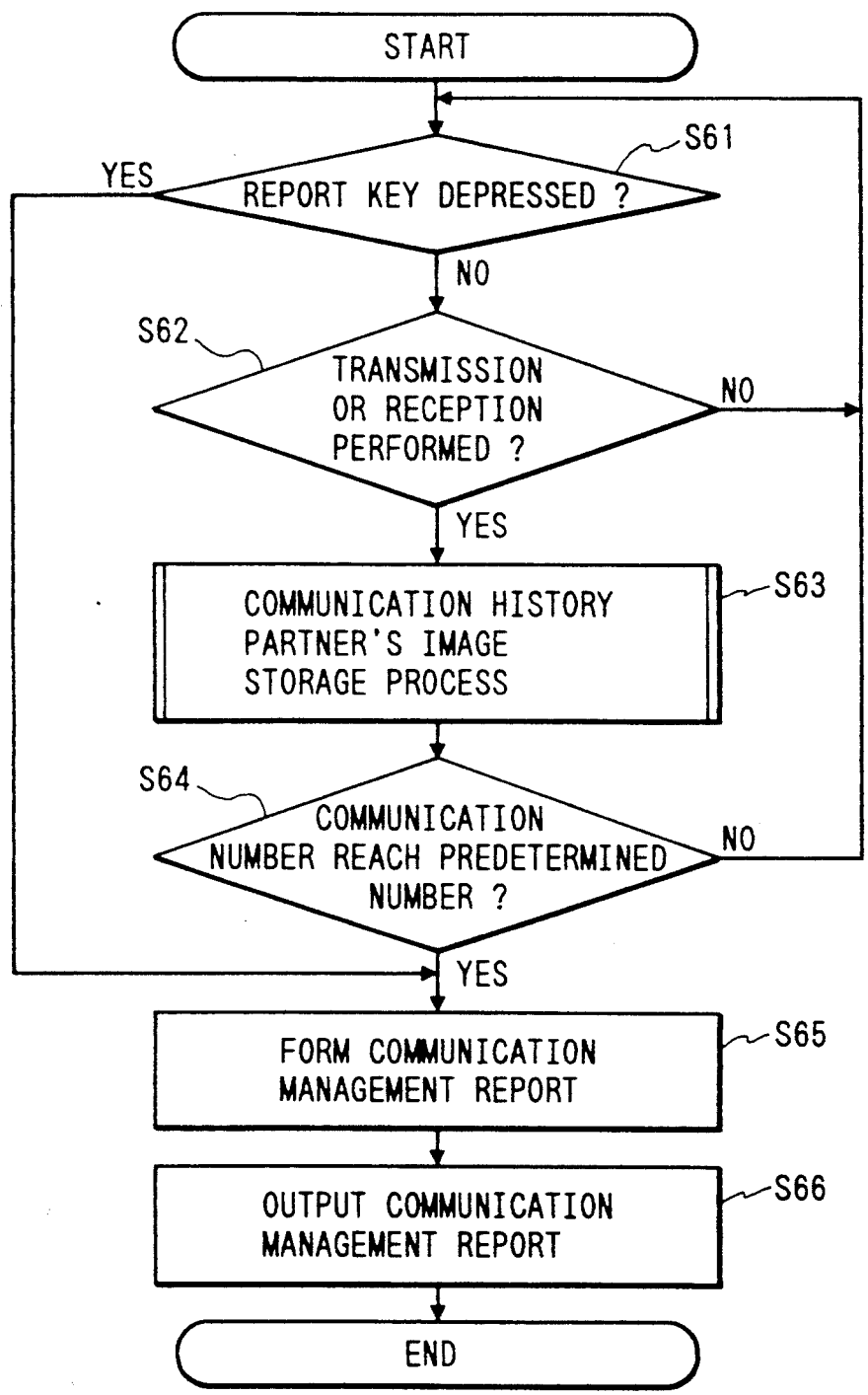
FIG. 14 is a flow chart of report outputting in accordance with the third embodiment.

Next, a process of forming a communication management report based on the communication history data 111-1 and partner's image data 111-2 stored in the memory 111 as shown in FIG. 14 and outputting the report will be described below based on the flow chart of FIG. 4.

The operation unit 109 is provided with a report key 109b (second operation means) for manually starting formation of a communication management report and outputting the formed report. In step S61, determination is made as to whether or not the report key 109b of the operation unit 109 has been depressed. If No, the process proceeds to step S62 and determination is made as to whether or not calling or incoming takes place in the line interface unit 114. If it is thereby determined that no calling or incoming takes place, the process returns to step S61 and the above determination operation is repeated.

Figure 12:
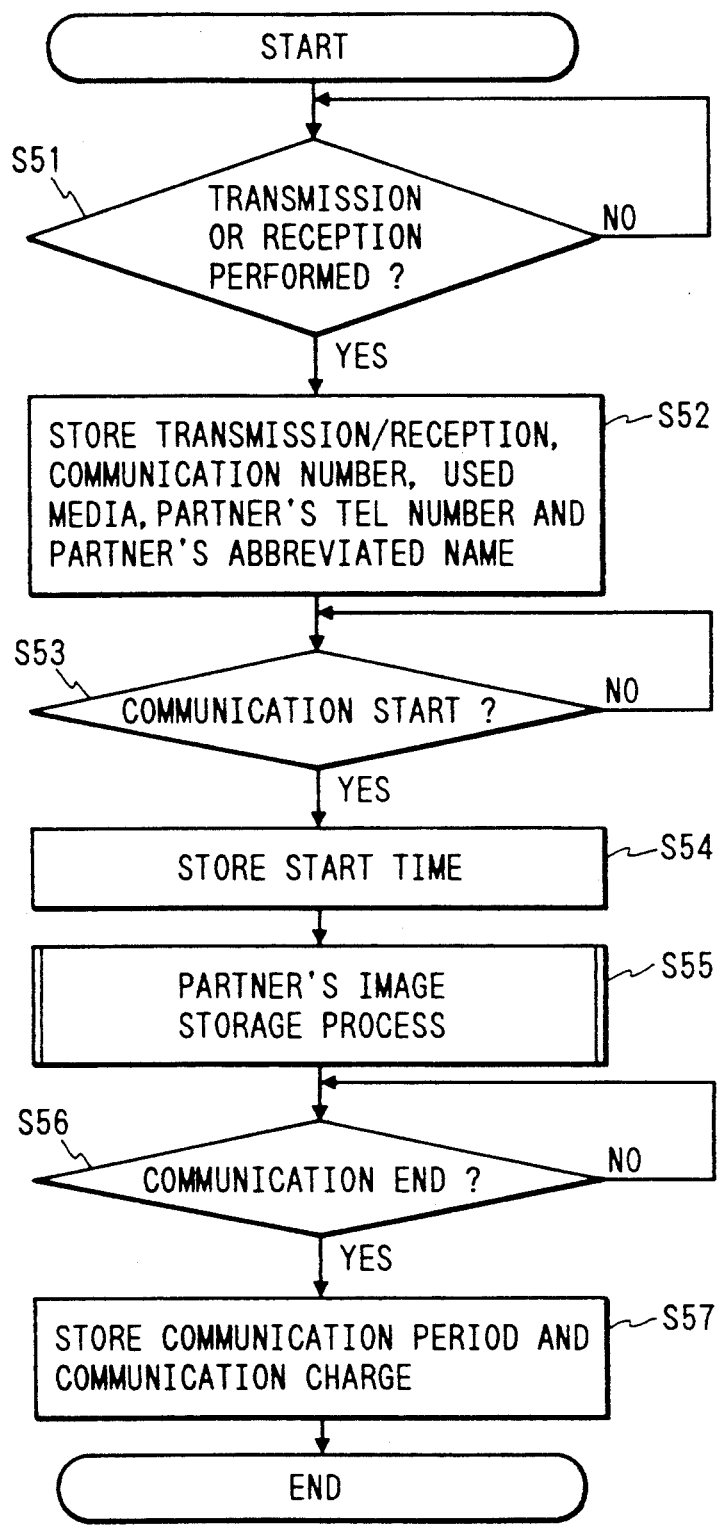
FIG. 12 is a flow chart of a procedure of processing for communication in accordance with the third embodiment.

If it is determined in step S62 that calling or incoming has taken place, the process proceeds to step S63 and the communication history and the partner's image are stored as in steps S52 to S57 of FIG. 12.

The system control unit 110 is provided with a communication number management means for automatically outputting a communication management report, whereby, in step S64, determination is made as to whether or not the number of communications has reached a predetermined number. If No, the process returns to step S61.

If it is determined in step S61 that the report key 109b has been depressed or it is determined in step S64 that the predetermined number of communications has been reached, the process proceeds to step S65 to form a communication management report. In this case, communication history data 111-1 and partner's image data 111-2 stored in the memory 111 as shown in FIG. 15 are combined in accordance with the standard format with respect to each communication to form a communication management containing the partner's image, such as that shown in FIG. 16. In step S66, the communication mangement report formed in step S65 is output by the output unit 12, thereby completing the process.

In this embodiment, communication numbers, used media, partner's telephone numbers, abbreviated partner's names, (communication) start times, communication periods and communication charges are included as items of communication history. However, other communication history items, e.g., communication modes, speech, 3.1 kHz audio, and 7 kHz audio, and communication error codes may be used as information for communication management reports.

Ordinarily, partner's images output in communication management reports are still images. However, images used the multi-media communication apparatus are not limited to still images and may include animated images. If an animated image is used, it is converted into a still image in the multi-media communication apparatus after being sent from the partner's apparatus.

In the above-described embodiment, the number of partner's image storing time is limited to one. However, partner's images may be stored a plurality of times by depressing the memory key 109a.

The above-described embodiment is limited to the process of actual communication. However, the multi-media communication apparatus in accordance with the present invention may have a caretaking function such that the above-described process is automatically conducted for incoming during operator's absence.

As described above, the multi-media communication apparatus in accordance with the above embodiment is arranged to output a communication management report with a partner's image, thereby making it possible to easily refer to past communication history. Since communication partner's face or the like is added to the communication history, it is possible to identify the communication partners and the communication times easily and positively.

In the multi-media communication apparatus in accordance with the above embodiment, a partner's image can be stored automatically or manually. It is thereby possible for the operator to store the partner's image to be recorded on a communication report without being conscious of this operation as well as to store and record an arbitrary partner's image on a communication report.

In the multi-media communication apparatus in accordance with the above embodiment, a communication management report can be formed by combining communication history data and partner's image data.

In the multi-media communication apparatus in accordance with the above embodiment, the operation of outputting a communication management report can be started automatically or manually. It is therefore possible for the operator to output communication management reports without failure and to output them at any time.

Further, the multi-media communication apparatus in accordance with the above embodiment has an automatic response function (caretaking function) such that a communication management report with a partner's image is output in the case of incoming during operator's absence, thereby providing an incoming record containing an image of the partner's face. It is thereby possible to easily and positively identify the terminal from which the incoming is received.

What is claimed is:

1. A multi-media communication apparatus comprising:
   communication means for communicating with a partner's apparatus by using different categories of data on a plurality of kinds of media;
   memory means for storing information on a communication, which information is generated when the communication is performed by said communication means;
   output means for visually outputting, as a communication report, the information on the communication stored by said memory means; and
   edition means for editing the information on the communication stored by said memory means, said outputting means outputting the information edited by said edition means as a communication report,
   wherein said edition means edits the information on the communication on each medium used by said communication means.

2. A multi-media communication apparatus according to claim 1, wherein said communication means effects a communication with the partner's apparatus by using voice, an image and code data.

3. A multi-media communication apparatus according to claim 1, further comprising designation means for designating outputting of a communication report, said output means outputting a communication report in accordance with the designation from said designation means.

4. A multi-media communication apparatus comprising:
- communication means for communicating with a partner's apparatus by using different categories of data on a plurality of kinds of media;
- memory means for storing information on a communication, which information is generated when the communication is performed by said communication means;
- output means for visually outputting, as a communication report, the information on the communication stored by said memory means; and
- edition means for editing the information on the communication stored by said memory means, said outputting means outputting the information edited by said edition means as a communication report,
- wherein said edition means edits information on the media used by said communication means during one communication.

5. An apparatus according to claim 4, wherein said communication means effects a communication with the partner's apparatus by using voice, an image and code data.

6. An apparatus according to claim 4, further comprising designation means for designating outputting of a communication report, said output means outputting a communication report in accordance with the designation from said designation means.

7. A multi-media communication apparatus comprising:
- communication means for communicating with a partner's apparatus by using different categories of data on a plurality of kinds of media;
- memory means for storing information on a communication, which information is generated when the communication is performed by said communication means;
- output means for visually outputting, as a communication report, the information on the communication stored by said memory means; and
- edition means for editing the information on the communication stored by said memory means, said outputting means outputting the information edited by said edition means as a communication report,
- wherein said edition means edits a communication management report by using, as a parameter, at least one of the media which can be used for communication by said communication means.

8. An apparatus according to claim 7, wherein said communication means effects a communication with the partner's apparatus by using voice, an image and code data.

9. An apparatus according to claim 7, further comprising designation means for designating outputting of a communication report, said output means outputting a communication report in accordance with the designation from said designation means.

10. A multi-media communication apparatus, comprising:
- communication means for effecting a communication on each kind of media including image, voice and data;
- memory means for storing information on each communication;
- formation means for forming a communication management report from the information on each communication; and
- output means for outputting the communication management report formed by said formation means,
- wherein said memory means stores information on the medium for each communication, and said formation means forms a communication management report based on the information on the medium for each communication.

11. A multi-media communication apparatus according to claim 10, wherein said output means outputs a communication management report by using, as a parameter, each of the kinds of media including image, voice and data.

12. A multi-media communication apparatus comprising:
- communication means for a communication with a partner's communication apparatus on each of kinds of media including image, voice and data;
- memory means for storing an image sent from the partner's communication apparatus and information on each communication;
- formation means for forming a communication management report containing an image from the image and the information on each communication stored by said memory means; and
- output means for outputting the communication management report formed by said formation means.

13. A multi-media communication apparatus according to claim 12, further comprising time monitoring means for automatically storing the image to be contained in a communication report, and first operation means for manually instructing the operation of storing the image.

14. A multi-media communication apparatus according to claim 12, wherein said memory means includes a first memory section for storing the image sent from the partner's communication apparatus, and a second memory section for storing information on communication with the partner's communication apparatus, and
- wherein said formation means forms a communication management report by combining the image from said first memory section and the information from said second memory section.

15. A multi-media communication apparatus to claim 12, further comprising communication number management means for automatically forming and outputting a communication management report when information on a predetermined number of communications and relating images are stored by said memory means, and second operation means for manually instructing the operation of forming and outputting a communication report.

16. A multi-media communication method comprising:
- a communication step of effecting a communication on each kind of media including image, voice and data;
- a storage step of storing information on each communication;
- a formation step of forming a communication management report from the information on each communication; and
- an output step of outputting the communication management report formed in said formation step,
- wherein, in said storage step, the information is stored on the medium for each communication, and wherein in said formation step, the communication management report is formed based on the information on the medium for each communication.

17. A multi-media communication method comprising:

a communication step of effecting a communication with a partner's communication apparatus on each of kinds of media including image, voice and data;

a storage step of storing an image sent from the partner's communication apparatus and information on each communication;

a formation step of forming a communication management report containing an image from the image and the information on each communication stored in said storage step; and an output step of outputting the communication management report formed in said formation step.

* * * * *

UNITED STATES PATENT AND TRADEMARK OFFICE
CERTIFICATE OF CORRECTION

PATENT NO. : 5,309,434
DATED : May 3, 1994
INVENTOR(S) : YOSHITO MAEKAWA

It is certified that error appears in the above-identified patent and that said Letters Patent is hereby corrected as shown below:

IN THE DRAWINGS

Sheet 1 of 13, FIG. 1, "COMTROL" should read --CONTROL--.

COLUMN 5

Line 57, "incoming" should read --reception--.

COLUMN 6

Line 10, "incoming" should read --reception--.
Line 12, "incoming," should read --reception,-- and "incom-" should read --reception--.
Line 13, "ing" should be deleted and "incoming," should read --reception,--.

COLUMN 8

Line 7, "incoming" should read --reception--.
Line 9, "incoming," should read --reception,--.
Line 10, "incoming" should read --reception-- and "incoming," should read --reception,--.
Line 65, "momory key 109a" should read --memory key 109a--.

UNITED STATES PATENT AND TRADEMARK OFFICE
CERTIFICATE OF CORRECTION

PATENT NO. : 5,309,434
DATED : May 3, 1994
INVENTOR(S) : YOSHITO MAEKAWA

It is certified that error appears in the above-identified patent and that said Letters Patent is hereby corrected as shown below:

COLUMN 9

Line 17, "incoming" should read --reception--.
Line 19, "incoming" should read --reception--.
Line 22, "incoming" should read --reception--.

COLUMN 12

Line 46, "apparatus to" should read --apparatus according to--.

Signed and Sealed this

Seventh Day of March, 1995

Attest:

BRUCE LEHMAN

*Attesting Officer*  *Commissioner of Patents and Trademarks*